US009587679B2

(12) United States Patent
Hirata

(10) Patent No.: US 9,587,679 B2
(45) Date of Patent: Mar. 7, 2017

(54) METHOD AND APPARATUS FOR MANUFACTURING ROLLING-ELEMENT BEARING

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 121 days.

(21) Appl. No.: 14/471,284

(22) Filed: Aug. 28, 2014

(65) Prior Publication Data

US 2014/0366378 A1 Dec. 18, 2014

Related U.S. Application Data

(62) Division of application No. 13/449,561, filed on Apr. 18, 2012, now abandoned.

(30) Foreign Application Priority Data

Apr. 28, 2011 (JP) ................................. 2011-100961

(51) Int. Cl.
*F16C 43/08* (2006.01)
*B21D 53/10* (2006.01)
(Continued)

(52) U.S. Cl.
CPC ............ *F16C 43/083* (2013.01); *B21D 53/10* (2013.01); *F16C 33/4629* (2013.01);
(Continued)

(58) Field of Classification Search
CPC ...... F16C 35/06; F16C 35/061; F16C 35/067; F16C 43/00; F16C 43/06; F16C 43/08;
(Continued)

(56) References Cited

U.S. PATENT DOCUMENTS

| 848,776 | A | * | 4/1907 | Sisson | F16C 19/08 29/441.1 |
| 2,998,635 | A | * | 9/1961 | Burritt, Jr. | F16C 29/04 29/441.1 |

(Continued)

FOREIGN PATENT DOCUMENTS

| CN | 101634339 | 1/2010 |
| JP | 7-151153 | 6/1995 |

(Continued)

OTHER PUBLICATIONS

Japan Office action, mail date is Jul. 1, 2014.
China Office action, mail date is Aug. 8, 2014.

*Primary Examiner* — Christopher Besler
(74) *Attorney, Agent, or Firm* — Greenblum & Bernstein, P.L.C.

(57) ABSTRACT

A rolling-element bearing in which a rolling element is retained in each of retaining openings formed in a retainer and method for manufacturing the bearing are provided. Each retaining opening is defined by a pair of inner side faces facing each other, and a pair of inner end faces facing each other. In the manufacturing method, with a support die being brought into contact with one of the inner side faces and the inner end faces of one of the retaining openings, the outer and inner circumferential surfaces of the retainer are pressed by an outer punch and an inner punch. Accordingly, on at least one of the inner side faces and the inner end faces, a first retaining piece and a second retaining piece for preventing the rolling element from falling off are formed on the outer circumferential surface and the inner circumferential surface of the retainer, respectively.

3 Claims, 7 Drawing Sheets

(51) Int. Cl.
  *F16C 33/46* (2006.01)
  *F16C 33/38* (2006.01)
  *F16C 19/46* (2006.01)

(52) U.S. Cl.
  CPC ........ *F16C 33/4676* (2013.01); *F16C 19/463* (2013.01); *F16C 33/3887* (2013.01); *F16C 2220/40* (2013.01); *Y10T 29/49643* (2015.01); *Y10T 29/49686* (2015.01); *Y10T 29/53* (2015.01); *Y10T 29/53104* (2015.01)

(58) Field of Classification Search
  CPC .... F16C 43/083; F16C 2220/40; B21D 53/12; Y10T 29/49643; Y10T 29/49686
  See application file for complete search history.

(56) References Cited

U.S. PATENT DOCUMENTS

| | | | |
|---|---|---|---|
| 3,350,149 | A | 10/1967 | Oechsler |
| 3,685,114 | A | 8/1972 | Vannest |
| 4,629,339 | A | 12/1986 | Morinaga |
| 4,755,065 | A | 7/1988 | Walter et al. |
| 4,874,260 | A | 10/1989 | Podhajecki |
| 5,647,674 | A | 7/1997 | Ohashi et al. |
| 5,722,780 | A | 3/1998 | Scharman |
| 5,885,009 | A | 3/1999 | Muntnich et al. |
| 6,039,475 | A | 3/2000 | Furukawa et al. |
| 6,102,580 | A | 8/2000 | Alling et al. |
| 6,461,049 | B2 | 10/2002 | Straub et al. |
| 7,252,436 | B2 | 8/2007 | Yokota et al. |
| 8,057,105 | B2 | 11/2011 | Earthrowl et al. |
| 8,313,246 | B2 | 11/2012 | Oishi et al. |
| 8,414,192 | B2 | 4/2013 | Sekimoto et al. |
| 2001/0003548 | A1 | 6/2001 | Straub et al. |
| 2006/0088237 | A1 | 4/2006 | Yamamoto et al. |
| 2007/0003178 | A1 | 1/2007 | Koyama |
| 2008/0260317 | A1 | 10/2008 | Earthrowl et al. |
| 2010/0054648 | A1 | 3/2010 | Oishi et al. |
| 2011/0091144 | A1 | 4/2011 | Oishi et al. |
| 2011/0142389 | A1 | 6/2011 | Takeuchi et al. |
| 2013/0308888 | A1 | 11/2013 | Oishi et al. |

FOREIGN PATENT DOCUMENTS

| | | |
|---|---|---|
| JP | 07-259865 | 10/1995 |
| JP | 10-115322 | 5/1998 |
| JP | 2000-18258 | 1/2000 |
| JP | 2004-144183 | 5/2004 |
| JP | 2005-163994 | 6/2005 |
| JP | 2006-009816 | 1/2006 |
| JP | 2006-125457 | 5/2006 |
| JP | 2009-270641 | 11/2009 |

* cited by examiner

METHOD AND APPARATUS FOR MANUFACTURING ROLLING-ELEMENT BEARING

CROSS-REFERENCE TO RELATED APPLICATION

This is a divisional application of pending U.S. patent application Ser. No. 13/449,561, filed Apr. 18, 2012. The disclosure of the above-identified application, including the specification, drawings, and claims, is incorporated herein by reference in its entirety.

BACKGROUND OF THE INVENTION

The present invention relates to a rolling-element bearing such as a roller bearing, in which a rolling element is retained in each of retaining openings in a retainer, and to a method and an apparatus for manufacturing the rolling-element bearing. More specifically, the present invention pertains to a rolling-element bearing that has retaining pieces for preventing rolling elements from falling off at the edges of the retaining openings, and to a method and an apparatus for manufacturing the rolling-element bearing.

Conventionally, methods for manufacturing roller bearings have been disclosed, for example, in Japanese Laid-Open Patent Publication No. 10-115322, Japanese Laid-Open Patent Publication No. 7-151153, and Japanese Laid-Open Patent Publication No. 2000-18258. According to the manufacturing method disclosed in Japanese Laid-Open Patent Publication No. 10-115322, the outer circumferential surface and the inner circumferential surface of a retainer are pressed simultaneously to form retaining pieces at the edges of each retaining opening on the outer circumferential surface and the inner circumferential surface. Japanese Laid-Open Patent Publication No. 7-151153 and Japanese Laid-Open Patent Publication No. 2000-18258 each disclose a manufacturing method in which projections formed on the inner side faces of each retaining opening are subjected to ironing to form retaining pieces at the edges of the retaining opening on the outer circumferential surface and the inner circumferential surface. Specifically, each retaining piece is formed by pressing the distal portion of a projection on the inner side face of the retaining opening in the direction of thickness of the retainer, thereby partially thinning the projection.

The above described conventional methods have the following drawbacks.

In the manufacturing method disclosed in Japanese Laid-Open Patent Publication No. 10-115322, when forming retaining pieces on the retainer, pressing force applied to the periphery of each retaining opening can cause the inner side faces of the retaining opening to bulge into the retaining opening. This narrows the width of the retaining openings, and thus hampers smooth rotation of rollers.

Also, according to the manufacturing methods disclosed in Japanese Laid-Open Patent Publication No. 7-151153 and Japanese Laid-Open Patent Publication No. 2000-18258, the strength of the retaining pieces cannot be sufficiently ensured because the retaining pieces are formed through ironing. Therefore, the rollers cannot be stably retained in the retaining openings for an extended period of time.

SUMMARY OF THE INVENTION

The present invention was made for solving the above problems in the prior art. Accordingly, it is an objective of the present invention to provide a rolling-element bearing that allows high-strength retaining pieces to be formed on the edges of the retaining openings by pressing the retainer, without causing the inner side faces of retaining openings to bulge into the retaining openings, and a method and an apparatus for manufacturing the rolling-element bearing.

To achieve the foregoing objective, and in accordance with one aspect of the present invention, a rolling-element bearing is provided. The rolling-element bearing includes a cylindrical retainer having a plurality of retaining openings formed in a circumferential wall, and a plurality of rolling elements, each of which is rotationally accommodated in one of the retaining openings. Each of the retaining openings is defined by a pair of inner side faces, which face each other, and a pair of inner end faces, which face each other. Each inner side face extends along a plane that contains an axis of the retainer, and each inner end face extends along a plane that contains a line perpendicular to the axis. At least one first retaining piece and at least one second retaining piece are formed in each retaining opening of the retainer by pressing the outer circumferential surface and the inner circumferential surface of the retainer, respectively. The first retaining piece and the second retaining piece are located on at least one of the inner side faces and the inner end faces. The first retaining piece and the second retaining piece are located on the outer circumferential surface and the inner circumferential surface of the retainer, respectively.

In accordance with another aspect of the present invention, a method for manufacturing a rolling-element bearing is provided. A rolling element is accommodated in each of a plurality of retaining openings formed in a circumferential wall of a cylindrical retainer. Each of the retaining opening is defined by a pair of inner side faces, which face each other, and a pair of inner end faces, which face each other. The method includes:

bringing a support die into contact with one of the inner side faces and the inner end faces of one of the retaining opening;

with the support die in contact, pressing the outer circumferential surface and the inner circumferential surface of the retainer, thereby forming at least one first retaining piece on the outer circumferential surface and at least one second retaining piece on the inner circumferential surface of the retainer;

accommodating the rolling element in the retaining opening; and after accommodating the rolling element, bending the at least one first retaining piece and the at least one second retaining piece such that the first retaining piece and the second retaining piece retain the rolling element in the retaining opening.

In accordance with a further aspect of the present invention, an apparatus for manufacturing a rolling-element bearing is provided. A rolling element is accommodated in each of a plurality of retaining openings formed in a circumferential wall of a cylindrical retainer. Each of the retaining openings is defined by a pair of inner side faces, which face each other, and a pair of inner end faces, which face each other. The apparatus includes a support die, a first punch, and a second punch. The support die is adapted to support one of the inner side faces and the inner end faces of one of the retaining opening. The first punch is adapted to press the retainer, thereby forming at least one first retaining piece and at least one second retaining piece on the face supported by the support die. The second punch is adapted to bend the first retaining piece and the second retaining piece formed by the first punch toward the retaining opening.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment according to the present invention will now be described with reference to the drawings. First, the structure of a roller bearing, which is a rolling-element bearing according to one embodiment of the present invention, will be described.

Figure 1:
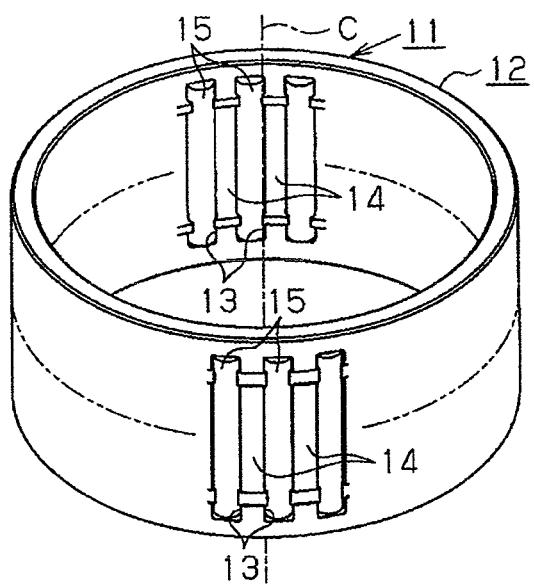
FIG. 1 is a perspective view illustrating a roller bearing that is manufactured through a manufacturing method according to one embodiment of the present invention.
Figure 2:
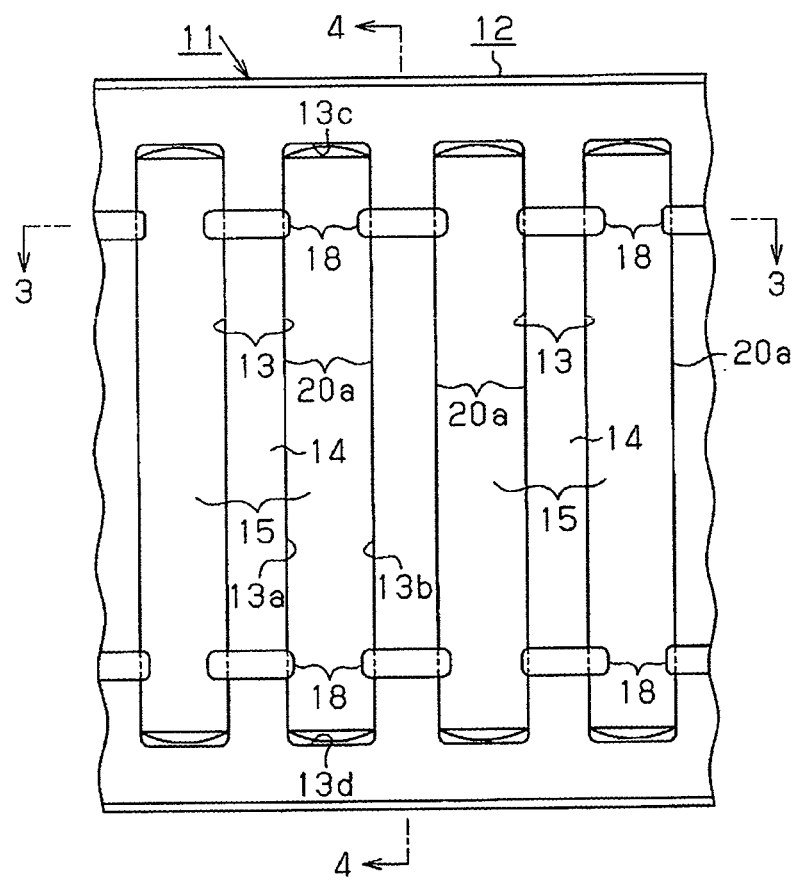
FIG. 2 is a front view illustrating a part of the roller bearing of FIG. 1.
Figure 3:
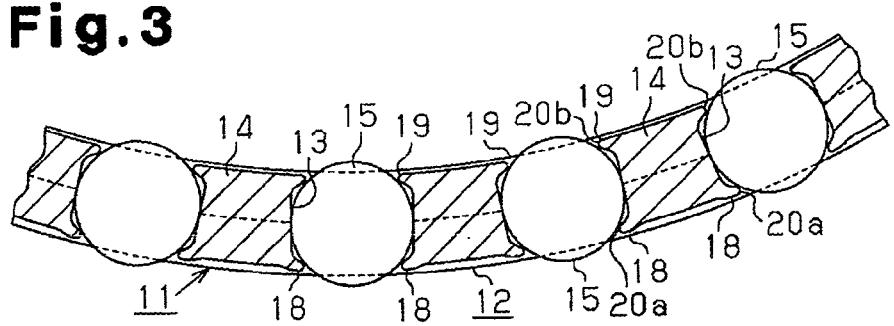
FIG. 3 is a cross-sectional view taken along line 3-3 in FIG. 2.
Figure 4:
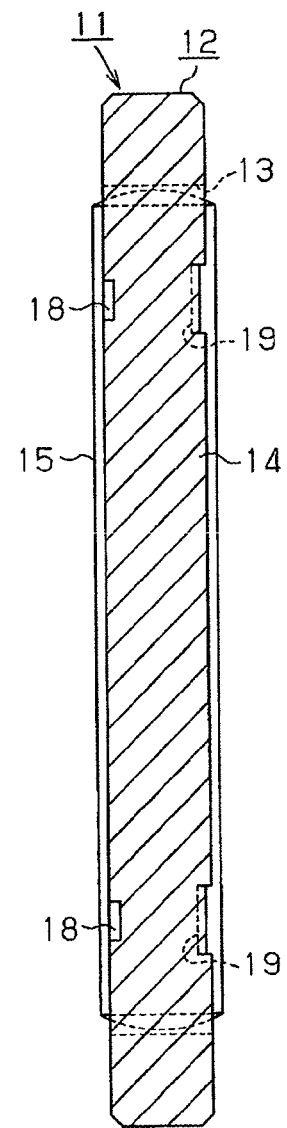
FIG. 4 is a cross-sectional view taken along line 4-4 in FIG. 2.
Figure 5:
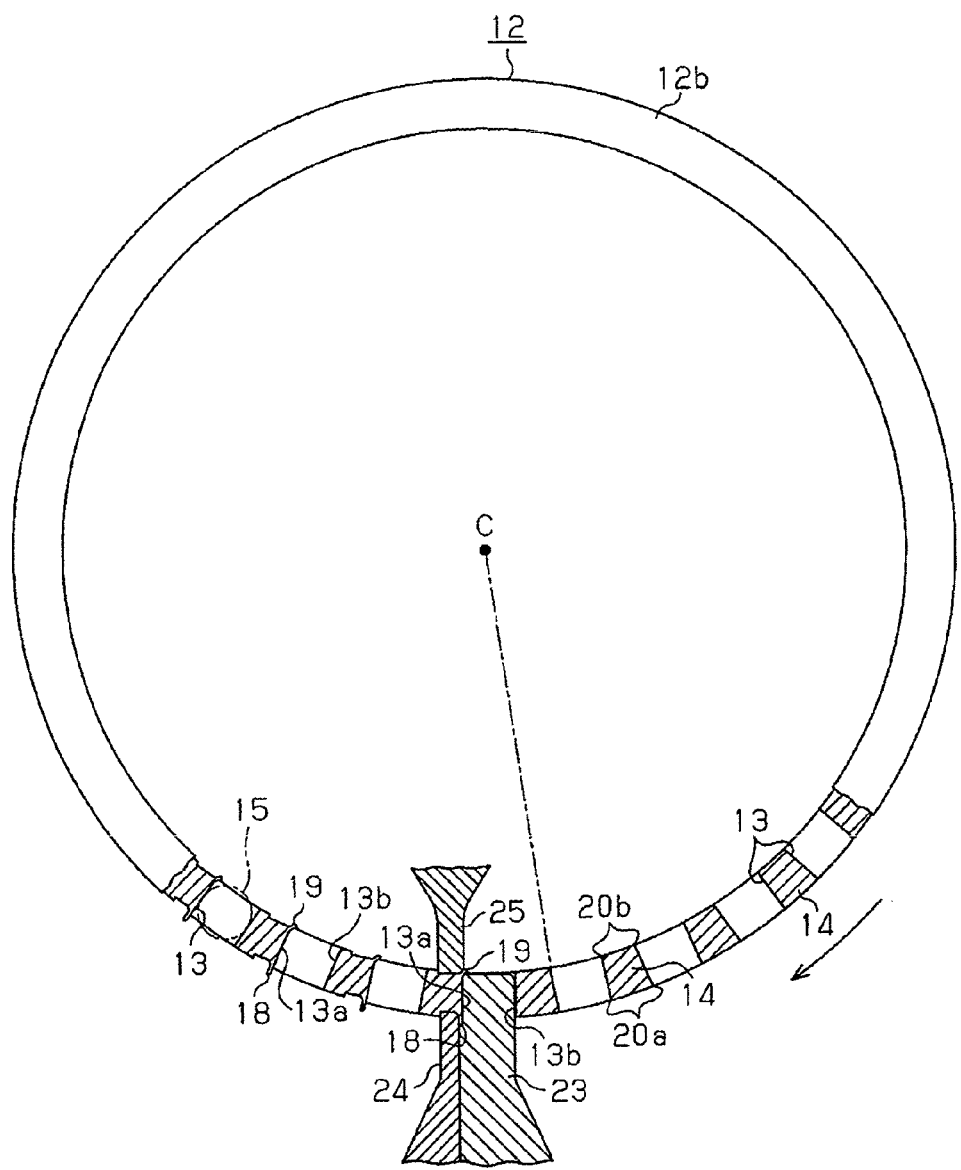
FIG. 5 is plan view, with a part cut away, illustrating the roller bearing in the claw forming process of the manufacturing method according to the embodiment of FIG. 1.

As shown in FIGS. 1 and 2, a retainer 12 of the roller bearing 11 is formed to be cylindrical, for example, through cutting a block-like brass workpiece. As shown in FIGS. 1 and 3, the retainer 12 has retaining openings 13, which are formed through the circumferential wall at predetermined intervals. As shown in FIGS. 2 and 5, each retaining opening 13 is defined by a pair of inner side faces 13a, 13b, which extend along the axis C of the retainer and face each other, and a pair of inner end faces 13c, 13d, which extend in a direction perpendicular to the axis of the retainer 12 and face each other. A pillar portion 14 is formed between adjacent pair of the retaining openings 13. As shown in FIGS. 3 and 4, each retaining opening 13 rotationally accommodates a roller 15, which serves as one of the rolling elements in the rolling-element bearing.

As shown in FIGS. 2, 3, and 5, each pillar portion 14 has a pair of outer side edges 20a, which are located on the outer circumferential surface of the retainer 12, and a pair of inner side edges 20b, which are located on the inner circumferential surface of the retainer 12. The outer side edges 20a and the inner side edges 20b of each pillar portion 14 are located on the inner side faces 13a, 13b of the corresponding retaining openings 13. A pair of the inner side faces 13a, 13b of each retaining opening 13 is located in planes that extend radially from the axis C as a center and also extend along the axis C. The inner side faces 13a, 13b extend along planes that contain the axis C. The outer side edges 20a of the pillar portions 14 form parts of outer shells of the retaining openings 13 on the outer circumferential surface of the retainer 12. The inner side edges 20b of the pillar portions 14 form parts of inner shells of the retaining openings 13 on the inner circumferential surface of the retainer 12. Two first claws 18, which project into the corresponding retaining opening 13, are formed on each outer side edge 20a of each pillar portion 14. The first claws 18 are arranged at a predetermined interval. The first claws 18 function as first retaining pieces for preventing the rollers 15 from falling off in the radially outward direction of the retainer 12. Two second claws 19, which project into the corresponding retaining opening 13, are formed on each inner side edge 20b of each pillar portion 14. The second claws 19 are arranged at a predetermined interval. The second claws 19 function as second retaining pieces for preventing the rollers 15 from falling off in the radially inward direction of the retainer 12. Each first claw 18 corresponds to one of the second claws 19 to make a pair, so that the first claw 18 and the second claw 19 in each pair face each other.

A method and an apparatus for manufacturing the above described roller bearing 11 and operation of the roller bearing 11 will now be described.

When manufacturing the roller bearing 11, a block-like brass workpiece is subjected to cutting to obtain a cylindrical retainer 12. Retaining openings 13 and pillar portions 14 are alternately formed in the retainer 12 at predetermined intervals.

Figure 6:
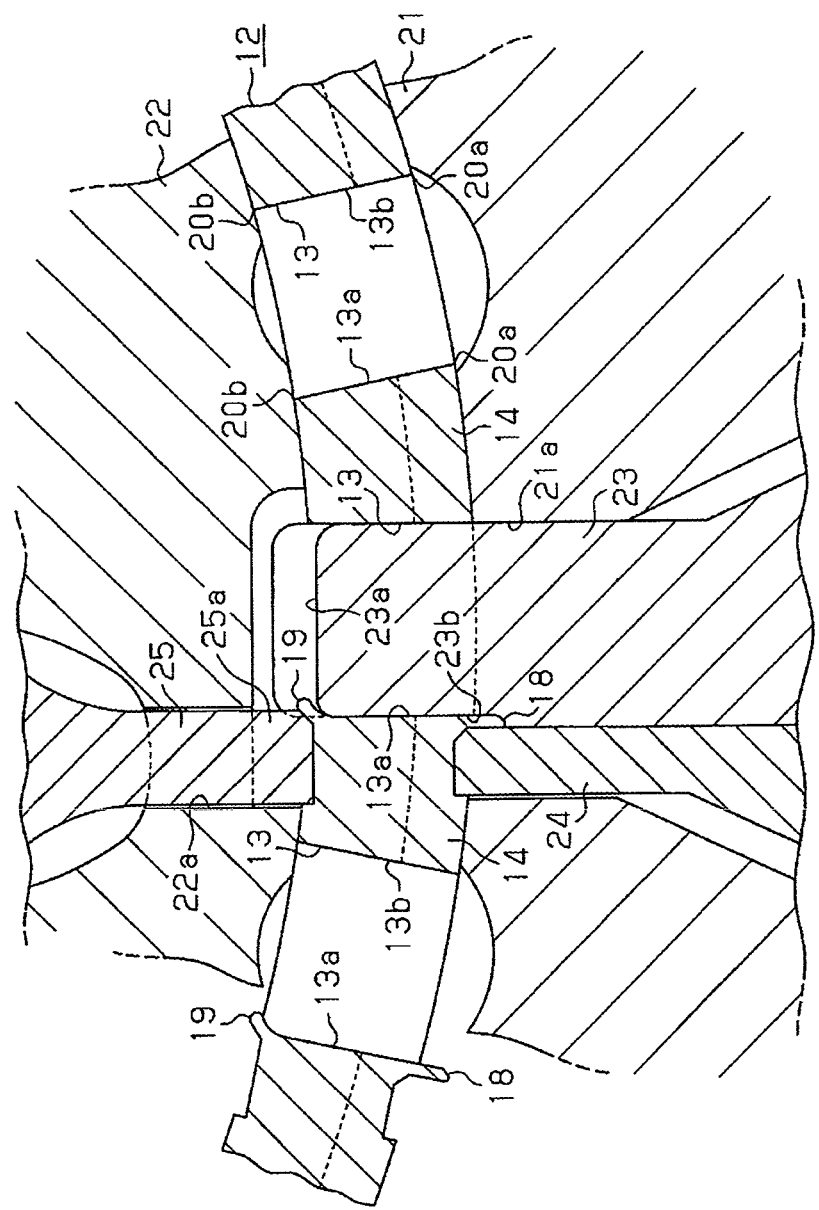
FIG. 6 is an enlarged cross-sectional plan view partially illustrating the roller bearing in the claw forming process shown in FIG. 5.
Figure 7:
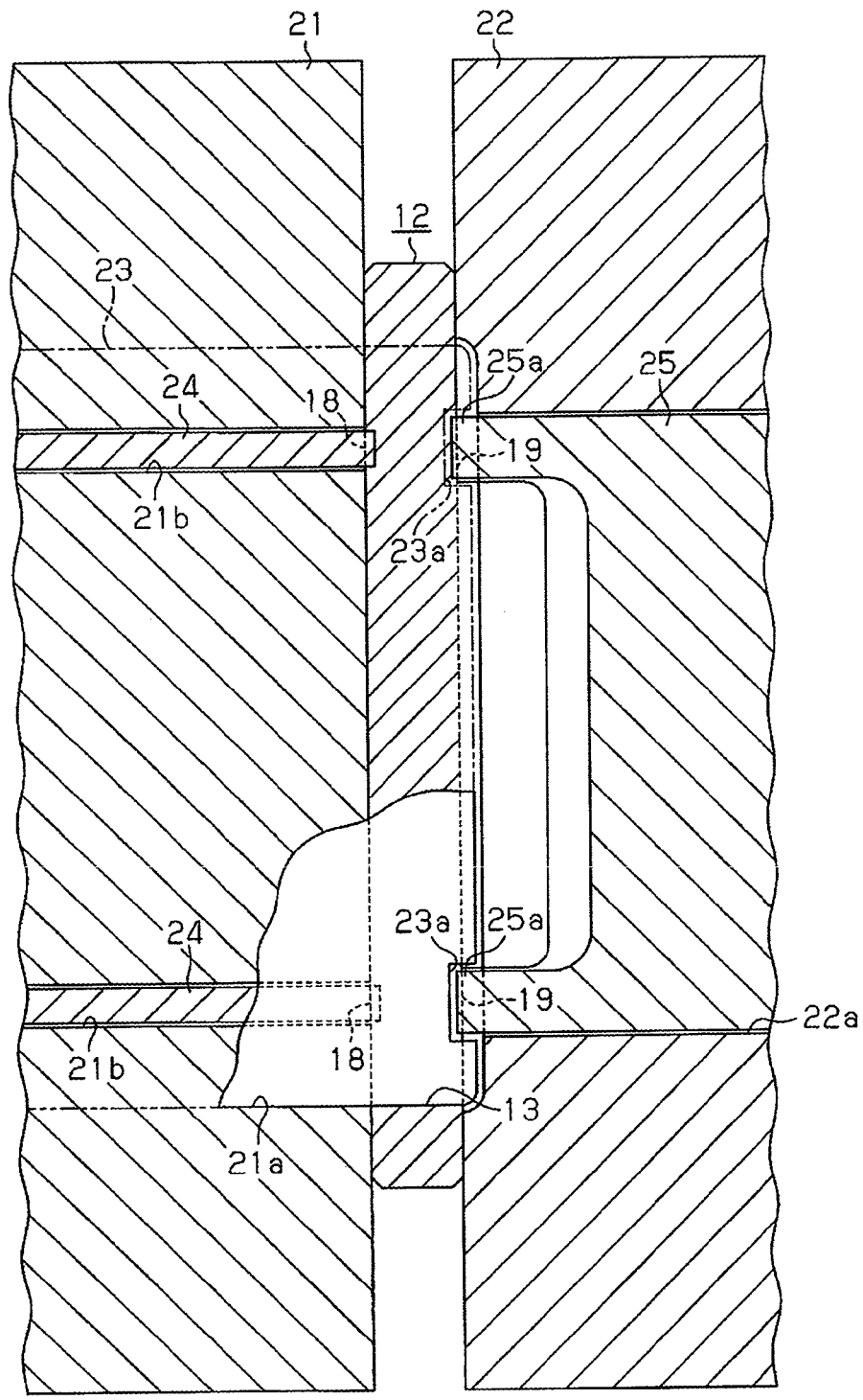
FIG. 7 is an enlarged vertical cross-sectional view partially illustrating the roller bearing in the claw forming process shown in FIG. 5.

Subsequently, as shown in FIGS. 5 to 7, two first claws 18 are formed on each outer side edge 20a of each pillar portion 14 at a predetermined interval, and two second claws 19 are formed on each inner side edge 20b of each pillar portion 14.

As shown in FIGS. 5 to 7, the manufacturing apparatus has a first outer stripper 21, which faces the outer circumferential surface of the retainer 12, and a first inner stripper 22, which faces the inner circumferential surface of the retainer 12. The first outer stripper 21 has a slit 21a, which extends along the axis C, and two holes 21b, which are arranged along the slit 21a. The first inner stripper 22 has a slit 22a, which extends along the axis C. The slit 22a of the first inner stripper 22 is aligned with the holes 21b of the first outer stripper 21 in the radial direction of the retainer 12. The manufacturing apparatus has a support die 23 in the slit 21a of the first outer stripper 21. The support die 23 is movable to be selectively inserted into and removed from one of the retaining openings 13. The manufacturing apparatus further includes a first punch, which is formed by two first outer punches 24 and a first inner punch 25 having two punch portions 25a at the distal end. The two first outer punches 24 are held to be movable in the radial direction of the retainer 12 so as to be passed through the two holes 21b of the first outer stripper 21, respectively. The first inner punch 25 is held to be movable in the radial direction of the retainer 12 so as to be passed through the slit 22a of the first inner stripper 22.

The retainer 12 is held between the first outer stripper 21 and the first inner stripper 22 of the manufacturing apparatus. The support die 23 is inserted into one of the retaining openings 13 from outside of the retainer 12, and a side of the distal end of the support die 23 is brought into contact with the first inner side face 13a of the retaining opening 13. In this state, the two first outer punches 24 press, from outside the retainer 12, two parts on the outer surface of the pillar portion 14 that are close to the outer side edge 20*a*. Simultaneously, the punch portions 25*a* of the first inner punch 25 press, from inside the retainer 12, two parts on the outer surface of the pillar portion 14 that are close to the inner side edge 20*b*. As shown in FIGS. 6 and 7, the support die 23 has at its distal end face two recesses 23*a* for avoiding contact with the two punch portions 25*a* of the first inner punch 25. The corner of each punch portion 25*a* that is close to the corresponding recess 23*a* is inclined to face the recess 23*a*.

As described above, the outer circumference surface and the inner circumferential surface of the retainer 12 are pressed by the first outer punches 24 and the first inner punch 25, so that, as shown in FIGS. 5 to 7, first claws 18 and second claws 19 are simultaneously formed on the outer side edge 20*a* and the inner side edge 20*b* of a pillar portion 14 that is located on the inner side face 13*a* of the corresponding retaining opening 13. A recess 23*b* is formed on a side surface of the support die 23. The recess 23*b* extends in the radial direction with the axis C as the center to allow the side surface to contact the inner side face 13*a* of the retaining opening 13. The recess 23*b* is longer than the thickness of the retainer 12 in the radial direction of the retainer 12. The angle of the distal end of each first outer punch 24 that is close to the recess 23*b* of the support die 23 is inclined to face the recess 23*b*. The first claws 18 are formed in accordance with the shapes of the corners of the first outer punches 24 and the recess 23*b* to protrude radially outward from the outer circumferential surface of the retainer 12. The second claws 19 are formed to extend toward the retaining opening 13 to slightly protrude inward of the retainer 12.

When the retainer 12 is pressed by the first outer punches 24 and the first inner punch 25, the support die 23 contacts the first inner side face 13*a* of one of the retaining openings 13, so that the first inner side face 13*a* is maintained as a flat surface. That is, the pressing force applied to the periphery of the retaining opening 13 from the first outer punches 24 and the first inner punch 25 does not deform the inner side faces of the retaining opening 13 to bulge inward of the retaining opening 13.

While intermittently rotating the retainer 12 in the circumferential direction as indicated by the arrow in FIG. 5, the support die 23, the first outer punches 24, and the first inner punch 25 are repeatedly operated in the manner described above so that first claws 18 and second claws 19 are sequentially formed in the first inner side face 13*a* of each of the retaining openings 13 of the retainer 12.

When the first claws 18 and the second claws 19 are formed on the first inner side faces 13*a* of all the retaining openings 13, the retainer 12 is inverted and held between the first outer stripper 21 and the first inner stripper 22 again. In this state, the support die 23 is brought into contact with the second inner side face 13*b* of one of the retaining openings 13, and not with the first inner side face 13*a* of the retaining opening 13. The outer circumference surface and the inner circumferential surface of the retainer 12 are pressed by the first outer punches 24 and the first inner punch 25, so that first claws 18 and second claws 19 are simultaneously formed on the outer side edge 20*a* and the inner side edge 20*b* of the corresponding pillar portion 14, which are located on the second inner side face 13*b* of the retaining opening 13.

Figure 8:
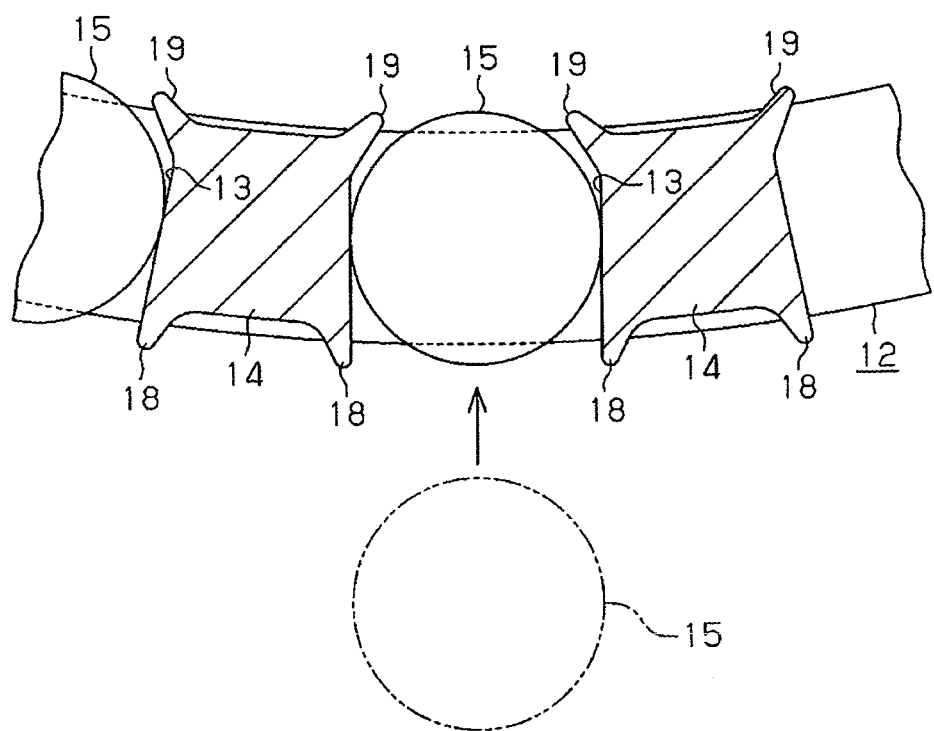
FIG. 8 is an enlarged cross-sectional plan view partially illustrating the roller bearing in a roller insertion process subsequent to the claw forming process shown in FIG. 5.
Figure 9:
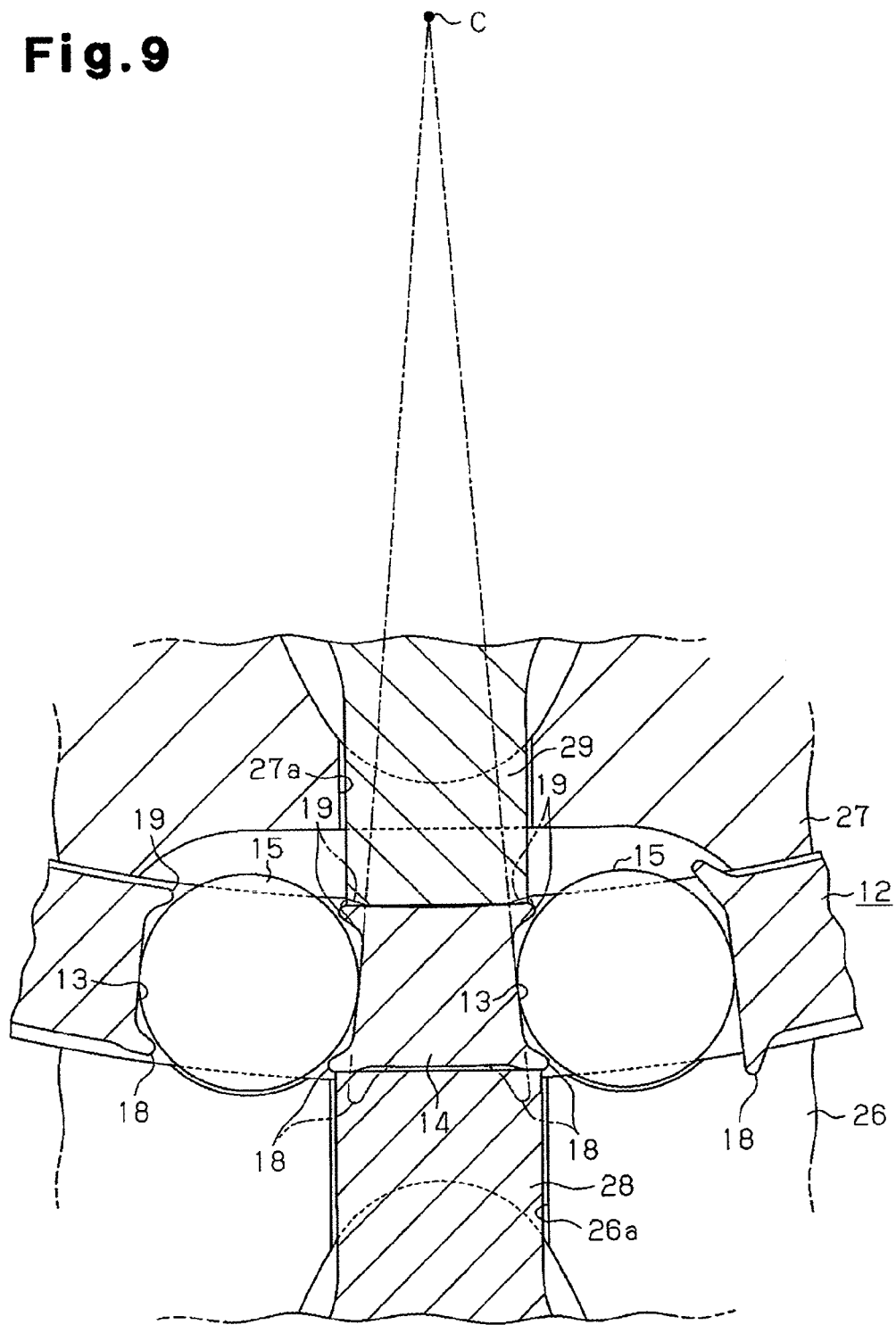
FIG. 9 is an enlarged cross-sectional plan view partially illustrating the roller bearing in a claw bending process subsequent to the roller insertion process shown in FIG. 8.

Subsequently, as shown in FIG. 8, a roller 15 is installed in each retaining opening 13 from the outside in the radial direction of the retainer 12. The manufacturing apparatus further includes a second outer stripper 26, which is configured to face the outer circumferential surface of the retainer 12, and a second inner stripper 27, which is configured to face the inner circumferential surface of the retainer 12. The second outer stripper 26 has a hole 26*a*, and the second inner stripper 27 has a hole 27*a*. The hole 26*a* of the second outer stripper 26 is aligned with the hole 27*a* of the second inner stripper 27 in the radial direction of the retainer 12. The manufacturing apparatus further includes a second punch. The second punch has a second outer punch 28, which is held to be movable in the radial direction of the retainer 12 so as to be passed through the hole 26*a* of the second outer stripper 26, and a second inner punch 29, which is held to be movable in the radial direction of the retainer 12 so as to be passed through the hole 27*a* of the second inner stripper 27. After the rollers 15 are installed, the retainer 12 is held between the second outer stripper 26 and the second inner stripper 27 as shown in FIG. 9. In this state, the second outer punch 28 presses a total of four first claws 18 on both outer side edges 20*a* of one of the pillar portions 14, and the second inner punch 29 presses a total of four second claws 19 on both inner side edges 20*b* of the same pillar portion 14. As obvious from FIG. 8, the second claws 19, which are formed by the first inner punch, are inclined toward the retaining opening 13. Also, indicated by lines formed by a long dash alternating with two short dashes in FIG. 9, the first claws 18, which are formed by the first outer punches 24, extend radially outward in the radial direction with the axis C as the center. Thus, the first claws 18 and the second claws 19 on both outer side edges 20*a* and both inner side edges of each pillar portion 14 are bent toward the corresponding retaining openings 13 by the second outer punch 28 and the second inner punch 29, which press the pillar portion 14 toward the center of the pillar portion 14. Therefore, the first claws 18 and the second claws 19 prevent each roller 15 from falling off to the outside or the inside from the associated retaining opening 13.

In accordance with the method for manufacturing a roller bearing as described above, the inner side faces 13*a*, 13*b* of each retaining opening 13 are formed as flat surfaces without bulging inward of the retaining opening 13. Therefore, the inner width of each retaining opening 13 is formed to be wide to allow smooth rotation of the roller 15.

The present embodiment has the following advantages.

(1) In the present embodiment, the outer circumferential surface and the inner circumferential surface of the retainer 12 are pressed in a state where the first inner side face 13*a* and the second inner side face 13*b* are brought into contact with the support die 23, so that the first claws 18 and the second claws 19 are formed on the inner side faces 13*a*, 13*b* of each retaining opening 13. Therefore, the support die 23 prevents the pressing force acting on the periphery of each retaining opening 13 from deforming the first inner side face 13*a* and the second inner side face 13*b* inward of the retaining opening 13 in a bulging manner. This limits an increase in the rotation resistance of the roller 15 retained in the retaining opening 13. Also, since ironing is not performed, the strength of the first and second claws 18, 19 can be sufficiently ensured. Therefore, when the roller bearing is used for an extended period of time, the first claws 18 and the second claws 19 are capable of retaining the rollers 15 in the retaining openings 13 in a stable manner.

(2) In the present embodiment, the outer circumferential surface and the inner circumferential surface of the retainer 12 are simultaneously pressed by the first outer punches 24 and the first inner punch 25 to simultaneously form the first claws 18 and the second claws 19 on the outer circumferential surface and the inner circumferential surface of the retainer 12. This increases the machining efficiency of the first claws 18 and the second claws 19.

(3) In the present embodiment, a roller 15 is installed in each retaining opening 13 before the first claws 18 and the second claws 19 are bent inward of the retaining opening 13 by the second outer punch 28 and the second inner punch 29. Therefore, the rollers 15 can be easily installed without being obstructed by the first claws 18 and the second claws 19.

(4) In the present embodiment, the first claws 18 are formed to extend in the radial direction with the axis C as the center at both outer side edges 20a of each pillar portion 14 by the first outer punches 24. Thus, the first claws 18 are inclined toward the retaining opening 13 relative to the second outer punch 28, which presses the pillar portion 14 toward the center of the pillar portion 14. Therefore, the first claws 18 can be spontaneously bent toward the retaining opening 13 when pressed inward of the retainer 12 by the second outer punch 28. It is thus easy to configure the first claws 18 to retain the rollers 15.

<Modification>

The present embodiment may be modified as follows.

In the above described embodiment, the inner stripper may have the support die 23. The support die 23 may be inserted into one of the retaining openings 13 from inside of the retainer 12 to be brought into contact with an inner side face of the retaining opening 13.

The rolling elements retained in the retaining openings 13 may be balls (steel balls). In this case, the length of each retaining opening 13 (the up-down dimension as viewed in FIGS. 1 and 2) is shorter than that in the above described embodiment. In this configuration, the rolling-element bearing of the present embodiment is embodied as a ball bearing.

In the above described embodiment, the first claws 18 and the second claws 19 are formed on both inner side faces of each retaining opening 13. However, first claws 18 and second claws 19 may be formed only on one of the inner side faces.

The first claws 18 and the second claws 19 may be elongated in the up-down direction as viewed in FIGS. 1 and 2.

In the above described embodiment, two pairs of first claws 18 and second claws 19 are formed on each inner side face of each retaining opening 13. However, one pair of first claw 18 and second claw 19 may be formed. Alternatively, three or more pairs of first claws 18 and second claws 19 may be formed.

In the above described embodiment, the first claws 18 and the second claws 19 are formed on the inner side faces 13a, 13b, which are parallel with the axis C of the retainer 12. However, first claws 18 and second claws 19 may be formed on at least one of a pair of the inner end faces 13c, 13d. Each of the inner end faces 13c, 13d is located in a plane that extends radially from a line perpendicular to the axis C as a center and also extends along the line perpendicular to the axis C. Each of the inner end faces 13c, 13d extends along a plane that contains a line perpendicular to the axis C. At the upper end and the lower end of each retaining opening in the direction of the axis C, the circumferential wall of the retainer 12 has a pair of outer end edges located on the outer circumferential surface of the retainer 12 and a pair of inner end edges located on the inner circumferential surface of the retainer 12. First claws 18 may be formed on at least one of the outer end edges, and the second claws 19 may be formed on at least one of the inner end edges.

Therefore, the present examples and embodiments are to be considered as illustrative and not restrictive and the invention is not to be limited to the details given herein, but may be modified within the scope and equivalence of the appended claims.

What is claimed is:

1. A method for manufacturing a rolling-element bearing, wherein a cylindrical rolling element is accommodated in each of a plurality of retaining openings formed in a circumferential wall of a cylindrical retainer, and each of the retaining openings is defined by a pair of inner side faces, extending along the axis of the cylindrical retainer and which face each other, and a pair of perpendicular inner end faces, extending in a direction perpendicular to the axis of the cylindrical retainer and which face each other, the method comprising:
    bringing a support die into contact with one of the inner side faces of one of the retaining openings;
    with the support die in contact, pressing an outer circumferential surface and an inner circumferential surface of the retainer, thereby forming at least one first retaining piece on the outer circumferential surface and at least one second retaining piece on the inner circumferential surface of the retainer;
    accommodating the roiling element in the retaining opening; and
    after accommodating the rolling element, bending the at least one first retaining piece and the at least one second retaining piece such that the first retaining piece and the second retaining piece retain the rolling element in the retaining opening.

2. The method for manufacturing a rolling-element bearing according to claim 1, wherein the forming the at least one first retaining piece and the at least one second retaining piece includes simultaneously pressing the outer circumferential surface and the inner circumferential surface of the retainer from outside and inside in the radial direction of the retainer.

3. The method for manufacturing a rolling-element bearing according to claim 1, wherein
    the inner side faces of each retaining opening extend along the axis of the retainer, and
    the forming the at least one first retaining piece and the at least one second retaining piece includes forming the at least one first retaining piece and the at least one second retaining piece on at least one of the inner side faces of the retaining opening so that the at least one first retaining piece and the at least one second retaining piece protrude in radial direction as the axis of the retainer as the center.

* * * * *